May 28, 1963
J. W. GOURLEY, JR
3,091,201
METHOD OF MAKING ROLLER GUIDES
Filed Aug. 20, 1959
2 Sheets-Sheet 1
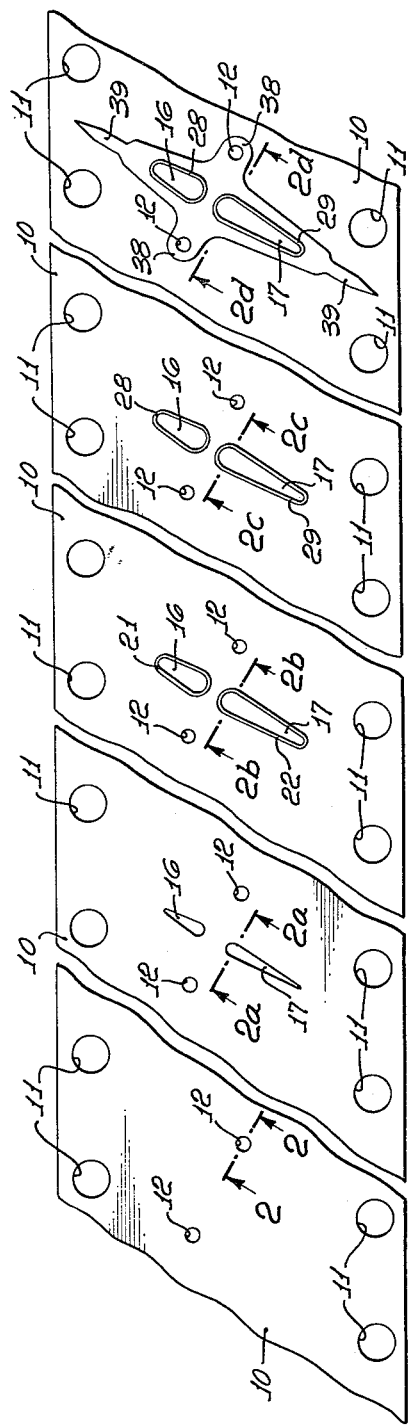
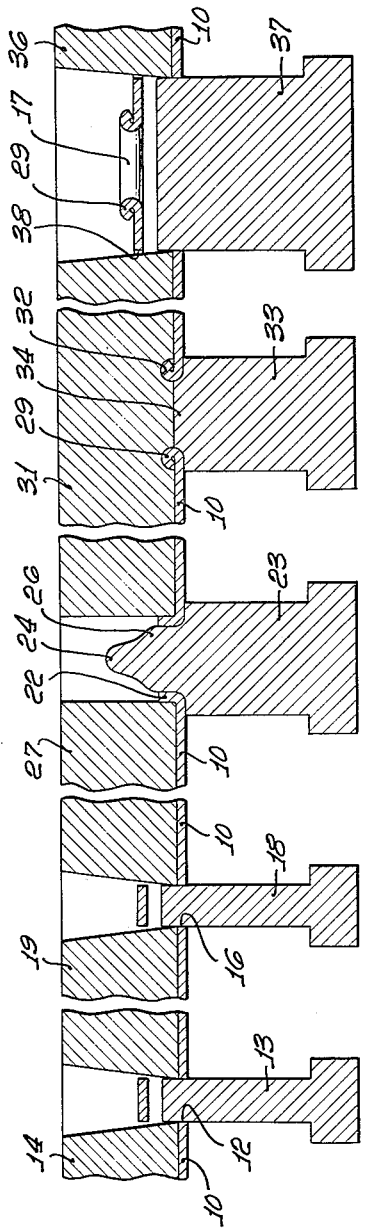
INVENTOR.
JAMES W. GOURLEY, JR.
BY
ATTORNEY.

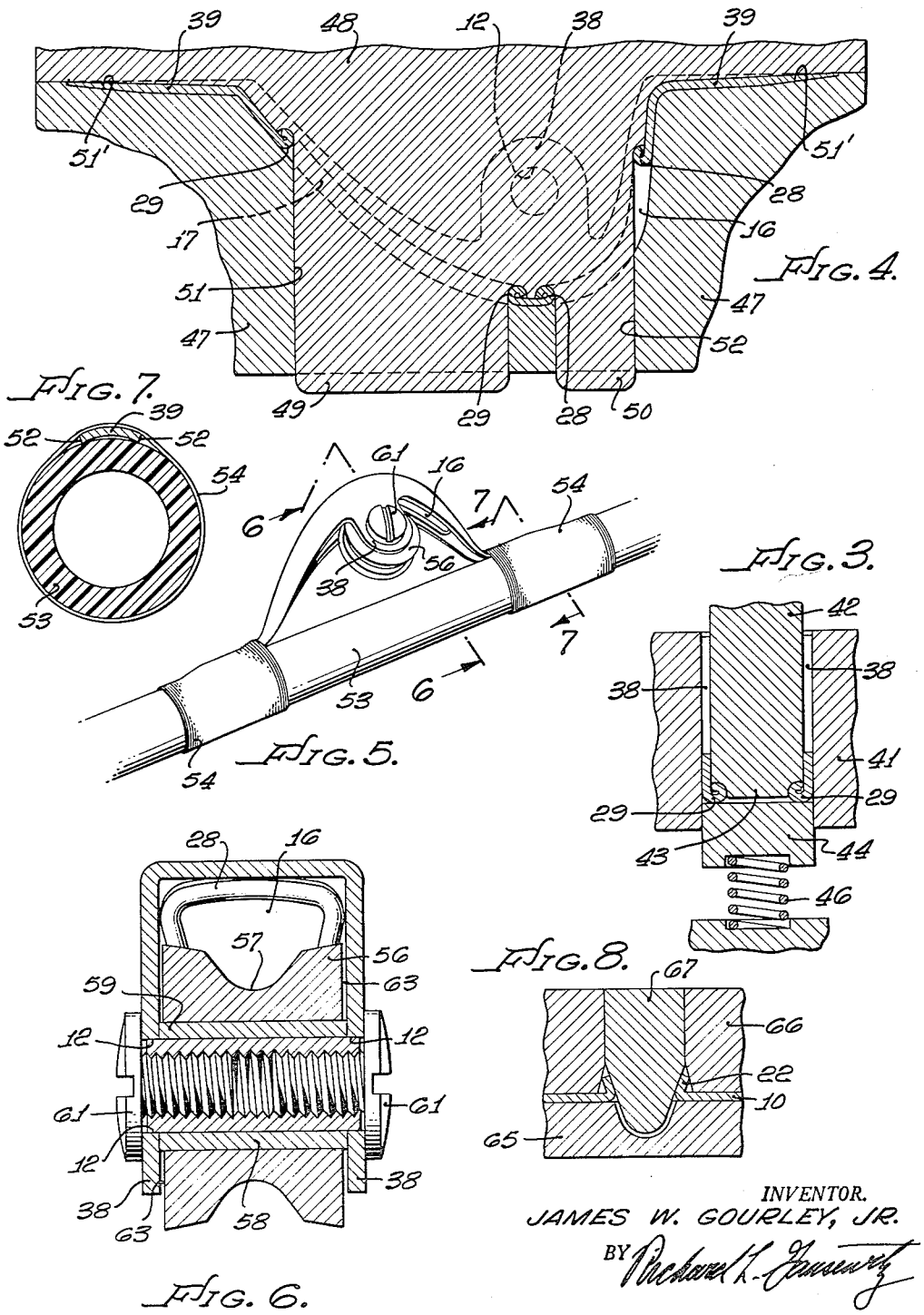

United States Patent Office 3,091,201
Patented May 28, 1963

3,091,201
METHOD OF MAKING ROLLER GUIDES
James W. Gourley, Jr., La Habra, Calif., assignor to Axelson Fishing Tackle Mfg. Co., Newport Beach, Calif., a corporation of California
Filed Aug. 20, 1959, Ser. No. 835,119
5 Claims. (Cl. 113—116)

This invention relates to a roller guide for fishing rods, and to a method of manufacturing the same.

An object of the present invention is to provide a roller guide which is beaded around the openings therein so as not to fray the fish line passing therethrough, which has dished and coined feet to permit rapid and non-wobbling mounting thereof onto a fishing rod, which is characterized by extremely low friction relative to the line, and which is so constructed that it is impossible for the line to shift off the roller.

A further object is to provide a method of manufacturing the frame for a roller guide from a single piece of metal and in such manner that the openings in the metal are encompassed by smoothly-rounded beads which prevent fraying of the line, and also in such manner that it is unnecessary to grind the feet in order to effect tapering thereof.

These and other objects and advantages of the invention will be more fully set forth in the following specification and claims, considered in connection with the attached drawings to which they relate.

In the drawings:

FIGURES 1–1d, inclusive, are plan views schematically illustrating the results of method steps which occur prior to and including blanking of the frame from the strip stock;

FIGURES 2–2d, inclusive, are sections taken at section lines indicated on the respective FIGURES 1–1d and illustrate schematically the tools employed in performing the various method steps prior to and including blanking;

FIGURE 3 is a schematic cross-sectional view, taken at approximately the same sectional line as 2d–2d in FIGURE 1d, and illustrating the bending of the frame sides at right angles to the frame body;

FIGURE 4 is a longitudinal section illustrating the bending of the central frame portion into U-shape;

FIGURE 5 is a perspective view showing a completed roller frame as mounted on a fishing rod;

FIGURE 6 is an enlarged transverse section taken generally on line 6—6 of FIGURE 5;

FIGURE 7 is an enlarged sectional view taken on line 7—7 of FIGURE 5; and

FIGURE 8 is a schematic view illustrating a second embodiment of the invention, in which the flanging step illustrated in FIGURES 1b and 2b is followed by a step adapted to bend the flanges at oblique angles relative to the horizontal.

Referring first to FIGURES 1–1d and 2–2d, the first step in the method comprises providing strip stock 10 of a suitable corrosion-resistant metal, and preferably having guide holes 11 therein to facilitate centering with respect to various punches and the like. Relatively small holes 12 are punched in the stock in spaced relationship, by means of the punch 13 and die 14 illustrated in FIGURE 2. Such holes are adapted to receive a pin and screws shown in FIGURE 6.

As the next step in the method, two teardrop-shaped holes 16 and 17 are punched in stock 10 midway between holes 12 and along a common major axis which is perpendicular to a straight line between the holes 12. The teardrop-shaped holes 16 and 17 are normally of unequal length, and the wide ends thereof are spaced substantially equal distances on opposite sides of the above-indicated line between holes 12. The holes 16 and 17 are formed by means of punches and dies the shapes of which correspond to the hole shapes illustrated in FIGURE 1a, a representative punch 18 and die 19 being represented in FIGURE 2a.

Referring next to FIGURES 1b and 2b, the next step in the method comprises increasing the sizes of the tear-drop holes 16 and 17 and forming flanges 21 and 22, respectively, therearound. This is accomplished, in the case of each of the holes 16 and 17, by employing a punch 23 having a pilot portion 24 somewhat smaller than the unflanged hole illustrated in FIGURE 1a, and also having an enlarged portion 26 which is shaped and sized correspondingly to the desired inner dimension of each hole subsequent to flanging. A die 27 is employed having openings which are shaped correspondingly to the flanged holes and which are sized in accordance with the distances between outer surfaces of the flanges.

The next step in the method comprises forming the respective flanges 21 and 22 into beads 28 and 29. To accomplish this, a die 31 is provided which has two channels corresponding to the shapes of the finished beads, one such channel being indicated at 32 in FIGURE 2c. Each channel is semi-circular in cross-sectional shape so that the associated flange will bend into a smoothly-rounded configuration when the punch or movable component 33 is forced into engagement with the strip stock 10 and die 31 as shown in FIGURE 2c. Punch 33 is formed with two raised portions, one of which is indicated at 34, which are shaped correspondingly to the shapes of the holes 16 and 17 and which are rounded to fit against the rounded lower portions of the flanges.

FIGURES 1d and 2d illustrate the next step in the method, namely the punching of a blank which contains the beaded openings 16 and 17 and also the holes 12. This is accomplished by means of a die 36 and punch 37 which are so shaped that the resulting blank is elongated longitudinally of the common major axis of openings 16 and 17, and has rounded sides or wings 38 which are generally concentric with the respective holes 12. Longitudinally-projecting portions 39 having pointed ends are provided at the ends of the blank, being adapted to be formed into feet as will be described hereinafter.

Referring next to FIGURE 3, the next step in the method comprises bending the frame sides 38, and also the portions of the frame body immediately adjacent the sides of beaded openings 16 and 17, into planes at right-angles relative to the common plane of beads 28 and 29. A suitable die 41 is employed which has an opening shaped correspondingly to the main body of the blank but sufficiently smaller to result in bending of the sides. A punch 42, having a similar shape except that it is smaller by the thickness of the stock, is inserted into the die 41 (FIGURE 3) until pilot and centering portions 43 come into engagement with a stripper member 44. The pilot and centering portions 43 are shaped correspondingly to the openings 16 and 17 (FIGURE 1d) and are rounded to receive the adjacent portions of the beads. The stripper 44 is spring-biased upwardly by means of a spring 46, to eject the flanged part from the die 41 upon withdrawal of the punch 42.

The main body of the roller frame is then bent into U-shape or hump-shape, with only the feet 39 remaining substantially in the original plane, by means of female and male dies 47 and 48 illustrated in FIGURE 4. The female die 47 has an opening shaped correspondingly to the external shape of the finished part (FIGURES 5 and 6) and confines the part on all sides including adjacent the side portions 38. Male die 48 is shaped correspondingly to the interior of the finished part and is provided with pilot and forming portions 49 and 50 adapted to be introduced through holes 51 and 52 in female die 47. Male die portions 49 and 50, and the corresponding holes 51 and 52, are shaped correspondingly to the shapes of the beaded openings 16 and 17 but are sufficiently small to permit withdrawal of the male die after completion of the forming operation, it being understood that the part tends to bind relative to the portions 49 and 50 as forming progress. It has been found that the portions 49 and 50 are important in maintaining the shapes of openings 16 and 17 and the beads 28 and 29 therearound. Thus, because of the presence of the portions 49 and 50, it is possible to bend the frame body into the relatively steep hump-shape shown in FIGURE 4 without eliminating the beads or changing the shapes of the openings excessively.

It is an important feature of the method and article that dies 47 and 48 are shaped to cause feet 39 to be dished or concave transversely of the frame. Furthermore, female die 47 is provided with taper portions 51' adjacent the ends of feet 39 in order to effect coining or tapering thereof to relatively small thicknesses. The amount of dishing of each foot 39 is such that the cross-sectional radius of curvature is smaller than the outer radius of the rod on which the frame is to be mounted. Thus, as is shown in FIGURE 7, the edges 52 of the feet will be in line contact with the outer rod surface to prevent wobbling of the frame on the rod. This is to be contrasted with frames in which there is only one line of contact between each foot and the rod, so that substantial wobble and instability result.

Referring specifically to FIGURES 5-7, a portion of a fishing rod is represented at 53 and has one of the roller frames mounted thereon. Mounting is accomplished by winding threads 54 around the rod and each foot 39. The winding operation is greatly facilitated, and the end product greatly improved, due to the above-mentioned tapering or coining of the ends of the feet, since this prevents the threads from dropping off the feet during or after winding. The forming of the taper by means of the coining operation described with relation to FIGURE 4 eliminates the necessity of grinding the ends of the feet.

FIGURE 6 illustrates a roller 56 having a peripheral groove 57 adapted to receive a fishline. The roller is loosely and rotatably mounted on a tubular bearing element 58, preferably formed of porous oil-soaked metal, and which additionally serves as the spacer which determines the distance between the frame side portions 38. The inner diameter of bearing 58 is the same as the diameters of the holes 12, so that an internally-threaded pin 59 may be inserted through the bearing and through holes 12 for reception of opposed screws 61. The pin 59 is shorter than the distance between the outer surfaces of sides 38 when the inner surfaces thereof are seated on the ends of bearing 58, which makes it possible to tighten the screws until the ends of the bearing 58 are tightly clamped by sides 38. The sides 38 are thus precisely spaced, which results in the presence of a predetermined important clearance 63 between the sides of roller 56 and the inner surfaces of sides 38.

It is pointed out that the beaded openings 16 and 17 are sufficiently narrow that it is impossible for the fishline to shift off the roller 56. The roller is thus always operable to reduce the friction caused by each line guide. The beads 28 and 29 not only reduce the friction relative to the line but also serve the very important purpose of preventing the line from becoming frayed or otherwise damaged.

Referring next to FIGURE 8, there is schematically illustrated a method step which may be performed between the steps indicated by drawing FIGURES 1b—2b and 1c—2c. Such additional method step includes forming each flange 21 and 22 in an upwardly-divergent manner so that it is oblique to the horizontal instead of perpendicular. Such bending of each flange permits the subsequent step (FIGURE 1c-2c) to effect tighter rolling of the beads 28 and 29, thereby preventing them from unrolling during subsequent operations even when the openings 16 and 17 are relatively large. The indicated forming operation may be performed by employing a recessed element 65 adapted to force the flanged stock 10 against the surface of an element 66 having recesses shaped correspondingly to the shapes of openings 16 and 17 (FIGURE 1b) but somewhat larger and also beveled. Downwardly-convergent elements 67 are thus forced into the openings to effect oblique bending of the flanges 21 and 22 as illustrated.

Various embodiments of the present invention, in addition to what has been illustrated and described in detail, may be employed without departing from the scope of the accompanying claims.

I claim:

1. A method of manufacturing a roller guide frame for fishing rods, which comprises forming two elongated and aligned openings in a flat sheet metal member, providing rolled beads on said member around said openings, and forming the mid-portion of said sheet metal member into a generally U-shape, said last-named step being performed by providing a female die having a recess therein shaped generally correspondingly to the desired exterior shape of the finished body portion of said member, providing a male die having a shape corresponding to the inner surface of the finished body portion of said member, said male die having pilot portions thereon shaped generally correspondingly to said openings and adapted to be inserted therethrough upon introduction of said male die into said female die, disposing said sheet metal member over said recess in said female die, and introducing said pilot portions through said openings into said female die and introducing said male die into said female die to effect forming of said mid-portion of said member into said U-shape.

2. A method of manufacturing a roller guide frame for fishing rods, which comprises providing sheet metal stock, forming relatively small round holes in said stock in spaced relationship, forming two elongated openings in said stock and having their major axes perpendicular to a line between said small round holes, said openings being spaced on opposite sides of said line, said major axes intersecting said line at a point intermediate said holes, forming flanges around said elonagted openings and simultaneously enlarging the same, effecting rolling of said flanges to provide beads around said elongated openings, thereafter punching from said stock a blank having side elements containing said small round holes and having an elongated body element containing said elongated beaded openings and also having end portions extending in opposite directions from opposite ends of said body element forming feet extensions, effecting bending of said side elements and of opposite side edges of said elongated body element at essentially right angles to a common plane containing said beaded openings and said feet extensions, and effecting bending of the portions of said blank between said feet extensions into generally U-shape without effecting unrolling of the beads around said beaded opening and without damaging said side elements and side edges.

3. The invention as claimed in claim 2, in which said method includes the additional step of bending said flanges around said elongated openings to oblique angles prior to formation of said beads.

4. The invention as claimed in claim 2, in which said last-named step is performed by providing a female die element having a recess therein shaped correspondingly to the exterior shape of the roller frame between said feet extensions, said female die element having openings therein corresponding to the shapes of said beaded openings in said blank, providing a male die element shaped correspondingly to the desired interior shape of said roller frame between said feet extensions and having pilot elements adapted to be inserted through said beaded openings and also through said openings in said female die element, inserting said pilot portions into said beaded openings and into said openings in said female die and inserting said male die into said recess in said female die to effect forming of said blank between said feet extensions into said generally U-shape without effecting unrolling of said beads.

5. The invention as claimed in claim 4, in which said method includes effecting shaping of said feet extensions into concave shapes tapering convergently away from said U-shaped body of the frame due to closing of said female and male die elements.

References Cited in the file of this patent

UNITED STATES PATENTS

| | | |
|---|---|---|
| 1,601,016 | Carlson | Sept. 28, 1926 |
| 2,051,639 | Kalmbacker | Aug. 18, 1936 |
| 2,274,835 | Koch | Mar. 3, 1942 |
| 2,320,498 | Wheeler | June 1, 1943 |
| 2,609,861 | Otterson | Sept. 9, 1952 |